FIG. 1

INVENTOR
J Edward Kostur
BY
ATTORNEY

July 13, 1965

J E. KOSTUR

3,193,881

AUTOMATIC PLASTIC FORMING AND TRIMMING MACHINE

Filed Sept. 6, 1961

INVENTOR
J Edward Kostur
BY John C. Brezina
ATTORNEY

3,193,881
AUTOMATIC PLASTIC FORMING AND TRIMMING MACHINE
J Edward Kostur, Elmhurst, Ill.; Pioneer Trust & Savings Bank, executor of the estate of said Kostur, deceased, assignor to Comet Industries, Inc., Bensenville, Ill., a corporation of Illinois
Filed Sept. 6, 1961, Ser. No. 141,938
10 Claims. (Cl. 18—19)

This invention is directed to novel vacuum molding and forming machines adapted for automatically trimming or die cutting, forming and trimming producing articles from plastic sheets, and films, and objects and accomplishments of the invention are:

(a) To provide an automatic vacuum molding machine having adjustably mounted upper and lower platens and mechanism for automatically selectively raising, lowering and positioning said platens at varying desired positions; and having separate cooperating selectively operable mechanisms connected to each of said platens for mounting, raising and lowering a pair of upper and lower die-supporting plates relative to each other and relative to said platens respectively whereby molds and parts of sectional separable dies may be selectively moved and separated or moved together relative to other portions of said dies and molds and relative to the plastic articles being formed.

(b) To provide automatic means and mechanism for selectively retracting or raising die-supporting plates and parts thereof and cooperating sectional dies and molds which are movably mounted between adjustably mounted platens, and cooperating selectively operable hydraulic mechanisms for selective positioning and movement of said platens which support dies and molds.

(c) To provide automatically operable machines having the aforesaid structural and mechanical features and having a pair of endless link chains, each chain being rotatably mounted along one side portion of said machine and carrying a plurality of plastic sheet gripping clamps; and having power driven means for selectively driving said chains in either direction to selectively deliver plastic sheets into an oven area and withdraw the same therefrom and to position the heated plastic sheets between vertically movable platens and between a plurality of cooperating dies which are movably mounted on separately movable die-carrying plates which are selectively movable by separate automatic mechanism; and also having mechanism and driven means for automatically releasing said plastic sheets or parts or scrap thereof after the formation or partial formation of the article.

(d) To provide a vacuum forming machine having automatically operable link chain means for delivering plastic sheets to an oven; mechanism for gripping, holding and guiding said sheets during their movements and for automatically positioning such sheets in a formation area between movable dies or molds, means for movably supporting cooperating dies and molds above and below such sheets; mechanical means for separating portions or sections of said dies from other portions thereof; mechanism for adjustably moving upper and lower platens which said platens carry selectively operable mechanism, including sub-platens to move separate die-supporting plates or sections on which said dies are carried, thereby providing for automatic and selective ranges of movements or strokes of said dies for both cutting and forming to meet the requirements of forming relatively deep and irregularly shaped plastic articles and of cutting away waste portions. Aforesaid includes mechanism for moving split molds, for pulling cores, for holding down sheet plastic, for extending parts of die sections and stripper plates and for retracting sub-platens after formation steps.

(e) To provide novel machines of the foregoing type in which separate mounting frame means or spiders are adjustably mounted for selective vertical positioning on a plurality of vertical posts or standards; and having automatically operable hydraulic mechanisms connected to said mounting frame means and to separately movable platens slidably mounted relative to vertical posts to selectively move and position said platens in different ranges of travel, said platens being adapted to hold cooperating dies thereon.

(f) To provide adjustable and movably mounted driven link chain mechanisms and releasable plastic holding means carried by said chain mechanisms which grip and deliver sheet plastic to oven areas and to areas between cooperating platens which carry dies and molds, and which feed mechanism is automatically controlled by dial setting of timers, said timers being actuated by repeat cycles when the platens are retracted, and which include a manually controlled switch means.

(g) To provide a machine having mechanism for selectively moving either one or both platens, either at different times or at the same time, and which includes limiting and control switches to automatically limit the distance of movements of said platens and for re-starting such movements for forming and for trimming after the the forming operation; and having means for automatically increasing the pressure on the platens to meet heavier load requirements and then for decreasing said pressure.

(h) To provide an automatically operable device cooperating with the platens, sub-platens and dies thereon for removing the finished parts or articles from their positions between the platens and sub-platens and which is retractably mounted and operated by air-operated cylinder and piston mechanism after completion of each machine cycle.

Other and further important objects of my invention will be apparent from the following description and appended claims.

Figure 1:
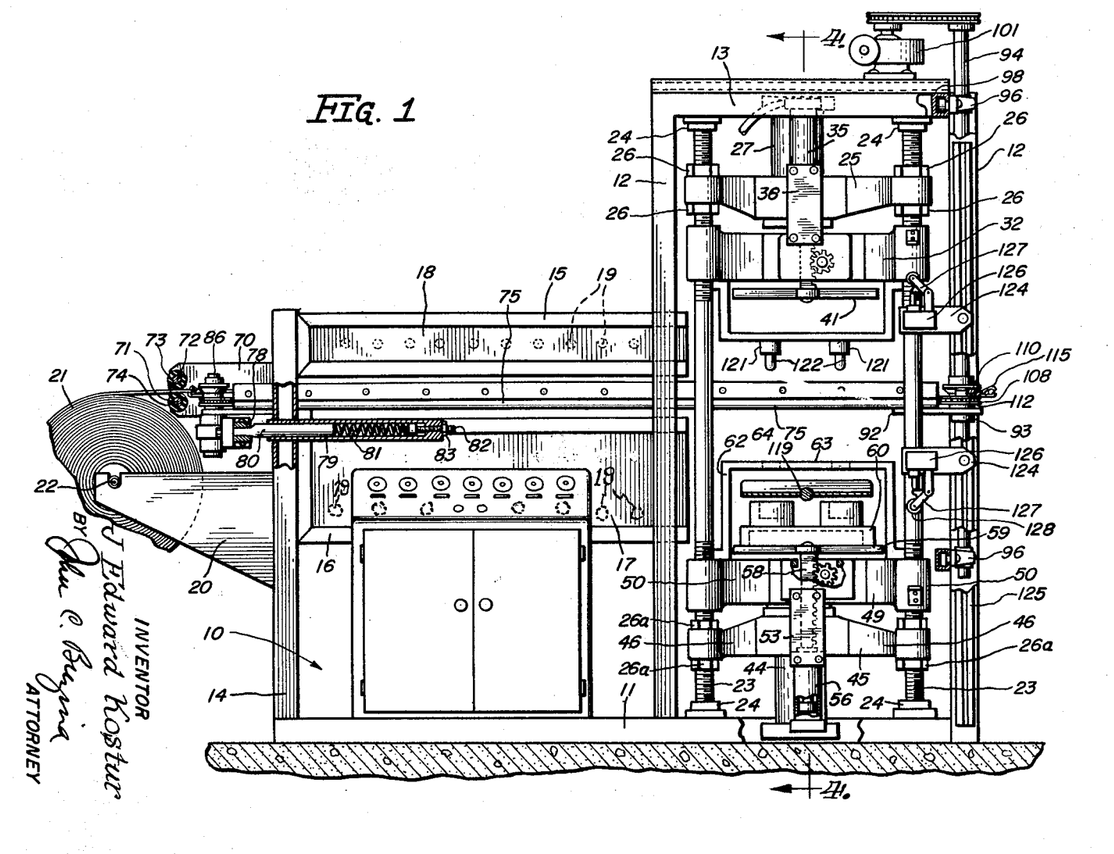
FIG. 1 is a side elevational view with parts broken away, showing one side of the machine and with the discharge end thereof shown at the right.
Figure 4:
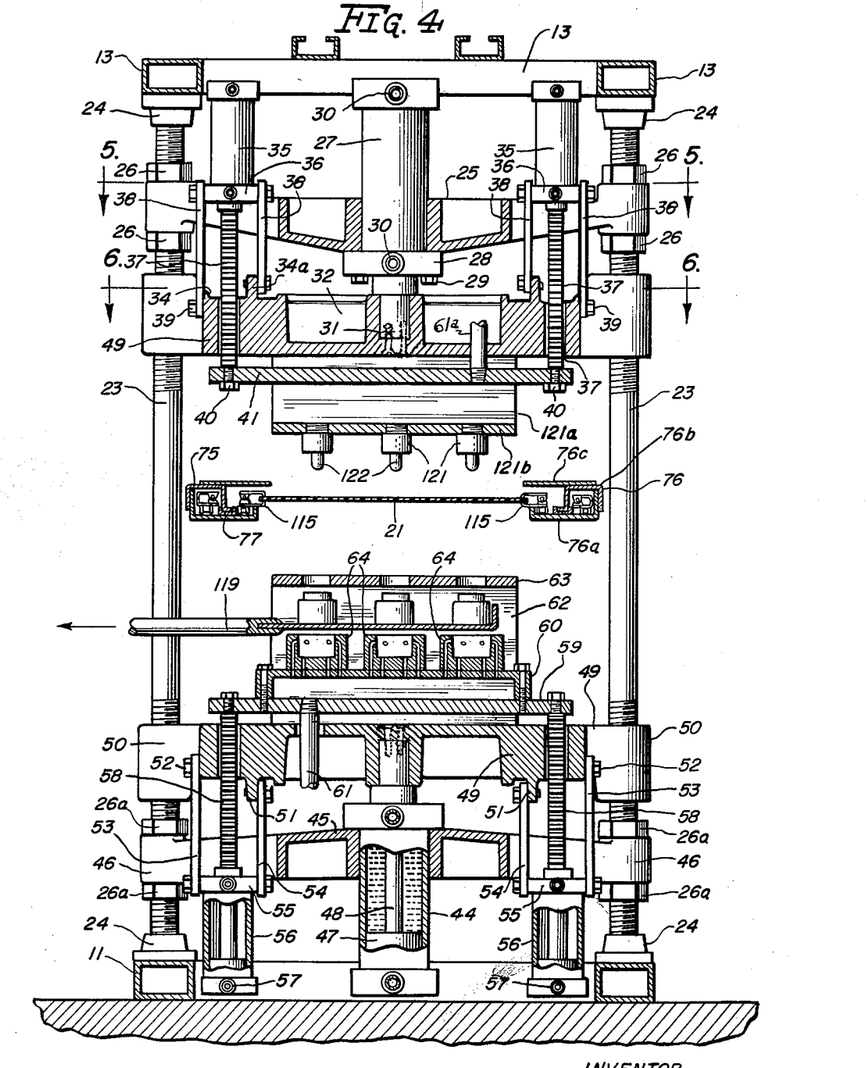
FIG. 4 is an enlarged fragmentary cross sectional view of two portions of one of the endless chains and adjacent guiding means, and taken substantially on line 4—4 of FIG. 1.

Referring to the drawings, numeral 10 generally designates a frame having a plurality of horizontal base connectors or trusses 11 which are welded to and connect the lower end bars of four vertical transversely spaced metal bars, standards, or posts 12 which are preferably of substantially square cross section. The upper ends of said four corner posts 12 are connected together by an upper frame composed of three suitably connected-together horizontal bars 13, as illustrated in FIGS. 1 and 4. The two lateral spaced apart base trusses 11 are longer and extend substantially rearwardly, and have connected to their rear end portions the lower ends of two vertical metal standards 14, whose upper ends are connected respectively by a pair of horizontal connecting trusses 15 to the intermediate portions of the two rear vertical posts 12 by welding or the like.

As illustrated in FIG. 1, a pair of horizontal longitudinally extending cross bars 16 have their opposite ends respectively connected by welding or the like to the intermediate portions of the two rear vertical standards 14 and to the two intermediate taller vertical posts 12. A box-like upwardly opening metal oven 17 is mounted on and supported by the said two horizontal cross bars 16, and said oven has mounted along its inside walls by suitable means (not shown), a plurality of substantially U-shaped electrical heating elements such as Calrods 19, which are electrically connected to a control switch and to a source of electric power.

Mounted above said lower oven 17 and spaced therefrom is a horizontally extending downwardly opening upper oven 18 which is connected to the upper trusses 15, and which has mounted therein by means (not shown), a plurality of spaced apart electrical heating elements 19 which are electrically connected to an electrical control switch and to a source of electric power. It will be noted that said upper and lower ovens 17 and 18 are substantially spaced apart to provide automatic means hereinafter described for selective moving therebetween plastic sheets or portions of plastic sheets which are adapted to be heated for the desired time and to the desired degree, as required for usual types of vacuum molding.

As shown at the left portion of FIG. 1, a pair of recessed bracket plates 20 are secured by welding on the outer faces of the vertical standards 14, and on which rolls of plastic film or plastic sheets 21 are adapted to be rollably supported by means of a suitable rod 22.

As illustrated in FIGS. 1, 4, 5 and 6, four externally threaded relatively thick metal guide rods 23 are mounted by means of flanged metal bushings 24 in vertical positions between the respective horizontally extending lower cross trusses 11 and the horizontal upper cross trusses 13, said metal bushings being suitably secured to said upper and lower trusses respectively, for example, by welding, said vertical guide rods 23 being positioned vertically substantially adjacent the corner posts of the machine frame, as illustrated in FIGS. 1, 4, 5 and 6, respectively. Said vertical guide rods 23 each have their opposite end portions externally threaded, as illustrated in FIG. 4.

Figure 5:
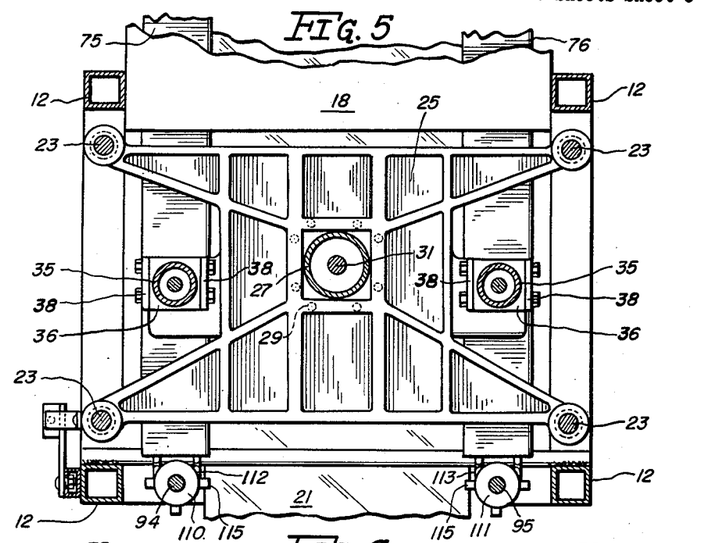
FIG. 5 is a cross section of said machine and showing various parts in cross section and taken on a horizontal plane, indicated by line 5—5 of FIG. 4, and showing one of the mounting spiders and adjacent parts.

Reference numeral 25 designates a relatively heavy cast metal upper mounting frame or spider which has two pairs of apertured oppositely extending integral passaged arms, as illustrated in FIG. 5, said arms being adjustably mounted to be selectively moved vertically on the upper threaded end portions of the four guide rods 23 and be releasably positioned, as herein described. Said upper mounting spider 25 is adjustably secured in the desired position by four pairs of nuts 26 which thread on the respective threaded portions of the guide rods 23, as illustrated in FIGS. 1 and 4, to provide for selectively positioning said mounting spider 25 at the desired height, and releasably locked with said nuts.

Said upper mounting spider 25 has a central relatively large angular passage therein in which is mounted a metal hydraulic cylinder 27 by means of an apertured mounting plate 28 secured thereto, said mounting plate 28 being secured to the upper spider 25 by a plurality of bolts 29 which thread into threaded passages formed in the middle portion of said mounting spider 25, as illustrated in FIG. 5. Said cylinder 27 has inlet and outlet fittings 30 mounted in its upper and lower portions, as illustrated in FIG. 4, which are communicatively connected by piping (not shown), to a suitable power-driven hydraulic pump (not shown). Said cylinder 27 has a conventional piston mounted therein (not shown), to which is connected the piston rod 31 whose outer end portion is securely mounted in the central passage of upper platen 32 which is slidably mounted for vertical movement, as hereinafter described.

Figure 6:
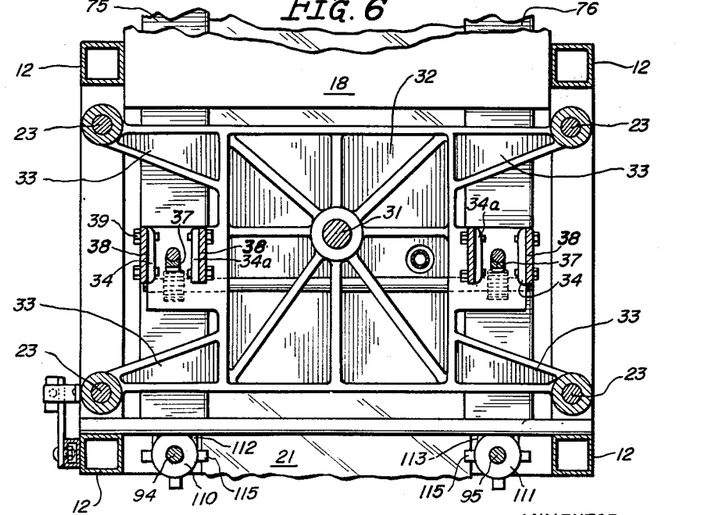
FIG. 6 is a cross section taken on a horizontal plane, indicated by line 6—6 of FIG. 4.

The upper platen 32 is illustrated in FIG. 6 in elevation, and has four integral corner passaged arms 33 whose parallel passages are positioned and spaced so that said platen is slidably mounted on the four vertical guide rods 23, onto which the same is mounted prior to the aforesaid mounting of the spider 25 and its respective nuts 26.

Said upper platen 32 has two pairs of spaced apart upwardly extending integral transversely passaged ears 34 and 34a, respectively, which is illustrated in FIG. 6. As shown in FIGS. 4–6, a pair of transversely spaced hydraulic or air cylinders 35 are secured to end mounting plates 36, which said plates are secured to the upper platen 32. The projecting piston rod of each of said cylinders 35 has a toothed rack bar 37 securely connected thereto, which said rack bars 37 depend downwardly and project through and below to passages between the respective ears 34 and 34a. The end plates 36 or cylinders 35 are connected by two pairs of metal connecting links 38 to the transverse apertured ears 34 and 35, respectively, by means of suitable bolts 39, as illustrated in FIGS. 4 and 6.

Removably mounted on the lower projecting ends of the rack bars 37 by means of suitable bolts 40 is a transversely extending metal guide supporting plate or sub-platen 41, as illustrated in FIG. 4.

Each of the cylinders 35 is communicatively connected by suitable fittings and piping (not shown), to an air pump (not shown), which provides for selective simultaneous projection and retraction of said pistons of said cylinders and of the respective rack bars connected to same.

Referring to the lower portion of FIGS. 1 and 4, numeral 45 designates a relatively heavy lower mounting spider which has opposite integral radial arms 46 which are mounted for adjustability on the respective vertical guide rods 23 by means of four pairs of adjustable nuts 26a. Said lower mounting spider 45 has a central opening therein in which is securely mounted a lower hydraulic cylinder 44.

Cylinder 44 (see FIG. 4), has slidably mounted therein a piston 47 to which is connected a vertical piston rod 48 whose upper end is suitably connected to the middle portion of the lower platen 49. The lower platen 49 is of the same construction as the upper platen 32, except that it is in reverse position relative to the position of said upper platen. Said lower platen has four integral journalling passaged corner arms 50 which are slidably mounted on the four vertical guide rods 23, respectively. Said lower platen 49 has a pair of passages therethrough, through which rack bars hereinafter described are movably mounted.

The lower platen 49 has a pair of dependent spaced apart apertured ears 51 thereon, as shown in FIG. 4. Said platen 49 also has threaded holes in its opposite said portions which receive threaded screws 52, which said screws extend through holes in the upper portions of two metal connecting links 53, respectively (see FIG. 4). Two links 54 have their upper apertures connected by screws through the depending ears 51, as shown in FIG. 4. Connected by screws to the aligned apertured lowered ends of the depending links 53 and 54 are two end plates 55 of two air cylinders 56, as illustrated partially in cross section in FIG. 4. The opposite ends of said air cylinders 56 are provided with suitable air fittings 57, fragments of which are shown in FIG. 4, and which are communicatively connected to a controlled compressed air pump (not shown).

Slidable piston rods and pistons of said air cylinders 56 are securely connected to a pair of vertically extending rack bars 58, respectively, to extend upwardly through spaced apart openings in the lower platen 49.

Secured to the upper ends of said rack bars 58 is a transversely extending sub-platen 59 by means of a plurality of bolts, as shown. Secured by a plurality of threaded bolts to said sub-platen 59 is the upper transversely extending manifold portion 60 of said sub-platen 59. Referring to FIG. 4, numeral 61 designates a portion of a pipe which is threaded through a hole in the sub-platen 59 and which communicatively connects the interior of the manifold 60 with an automatically controlled vacuum pump (not shown). See also FIGS. 11 and 12.

Figure 11:
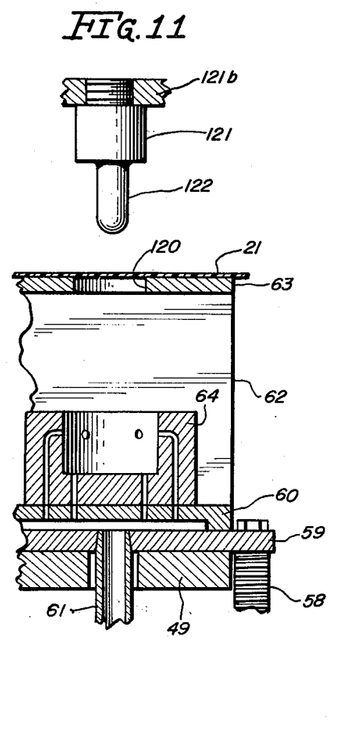
FIG. 11 is an enlarged partially cross sectional view of a typical split and sectional die and mold and its typical mounting relative to portions of the upper and lower sub-platens.
Figure 12:
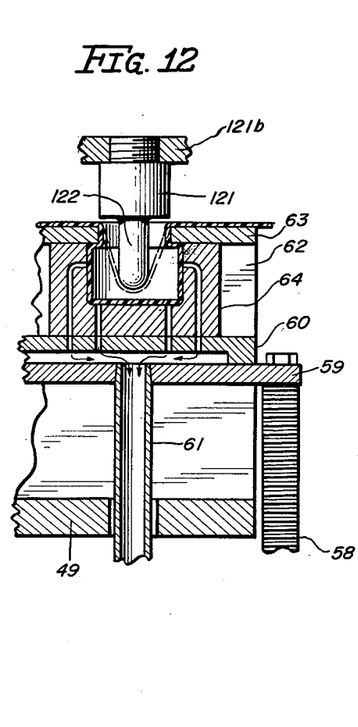
FIG. 12 is an enlarged partially cross sectional view of a typical split die and a mold mounted on upper and lower sub-plates and in position after the upper punch has pushed a plastic sheet into the mold, as shown in dotted lines, and showing in cross section the cup-shaped position of the plastic after it has been fully pulled and formed in the mold by vacuum.

Said pipe 61, and also pipe 61a, which is threaded in upper sub-platen 41, provide air passages and compressed air connections to provide for producing a partial vacuum and for selective introduction of compressed air used for air ejection and air cooling of the parts and for compressed air forming, namely, the pressing of the heated plastic with compressed air. Referring to FIGS. 4, 11, 12 and 13, numeral 62 designates one vertical sidewall of a box-like sectional die which has two of said walls 62 spaced apart and mounted on the lower platen 49, a fragment of which is illustrated in FIGS. 11 and 12. Said spaced apart vertical walls 62 of such multiple or split die have a connecting upper passaged wall 63.

Figure 13:
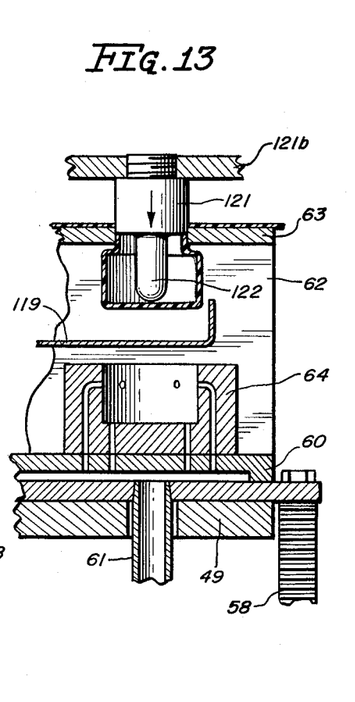
FIG. 13 is an enlarged cross sectional view of the lower mold retracted and the upper die lowered to cut and eject the plastic article from the upper plate die, and showing a fragment of a retractable chute or tray upon which the formed article is allowed to fall.

Referring to FIGS. 11, 12 and 13, numeral 64 designates a cavity mold which has a plurality of passages formed therein which are adapted to communicate with certain of the passages formed in the manifold 60 so that vacuum formed in said manifold will likewise draw air through said passages from said cavity mold. Said manifold 60 mounted on said separately movable sub-platen 59 and said cavity mold thereon are adapted to be selective and automatically moved upward by operation of the rack bars 58 vertically so that the upper face of said cavity mold will be held against the upper face of said top die plate 63, as illustrated in FIG. 12.

The respective steps and sequence of operation in said sectional and cooperating molds and dies are hereinafter described.

It will be understood that the upper platen 32 and the lower platen 49 are selectively and automatically adjustable and positionable to different positions to meet the requirements of the particular dies being used, by means of operation of the hydraulic cylinders 27 and 46, respectively, and their respective pistons and piston rods. It is to be further understood that the upper sub-platen 41 and the lower sub-platen 59 are independently and separately selectively positionable and movable by selective operation of the projection and retraction of the respective rack bars 37 and 58, respectively, the air pump connected to said upper and lower air cylinders 35 and 36 being independently and automatically operable and switch-controlled.

*Description of automatic means for automatically gripping and moving sections or sheets of plastic into and through oven and intermittently into positions between movable dies and movable platens*

Figure 2:
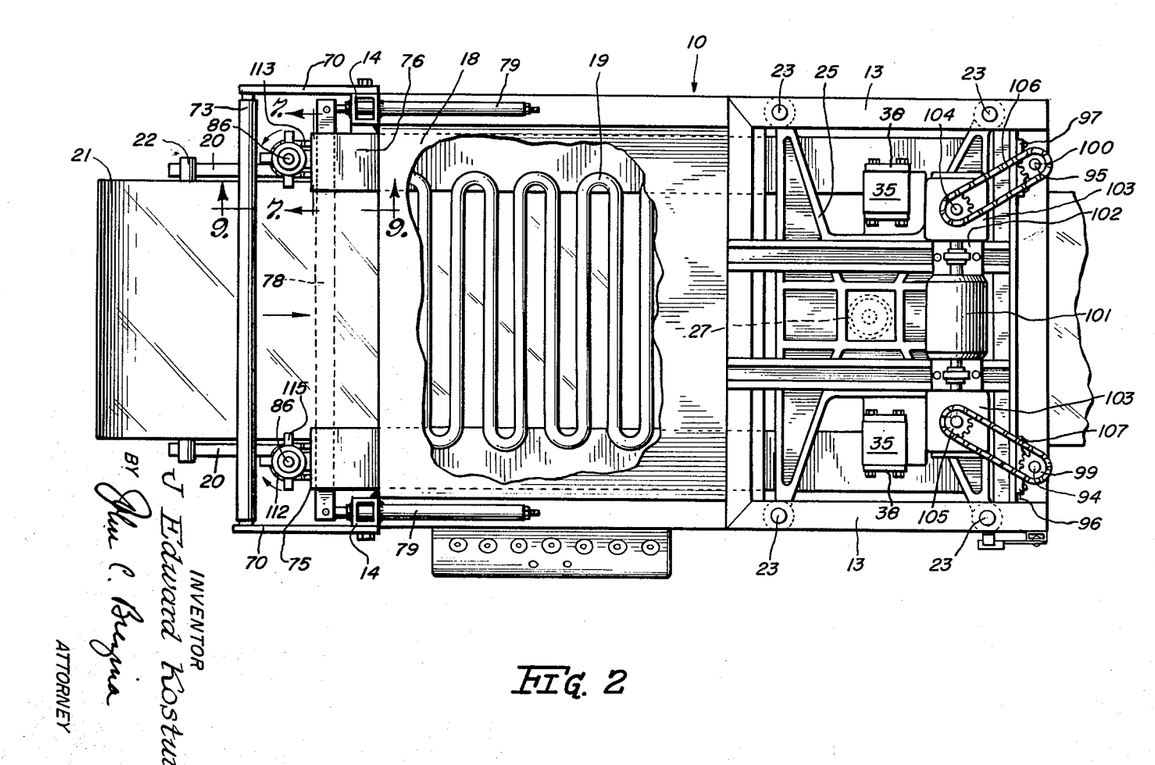
FIG. 2 is a top plan view thereof with parts broken away.

Referring to the left portion of FIGS. 1 and 2, numeral 70 designates one of a pair of horizontally extending brackets whose inner end portions are suitably secured by bolts to the rearmost vertical standards 14 of the frame of the machine. The outer end of the portions of said brackets 70 each have two spaced apart apertures therein in which are mounted two vertically spaced shafts 71 and 72 (see FIG. 1), said shafts extending through and rollably mounting a pair of adjacent feed rollers 73 and 74, respectively, whose outer peripheries are spaced apart only sufficiently to engage and impinge a plastic sheet being fed from the supply roll thereof rollably mounted on brackets 20 to the left thereof, as illustrated in FIG. 1, said rollers preventing the advanced plastic sheet from buckling until gripped as herein described. Said rollers 73 and 74 are provided with indexing means (not shown), which provides for selective feeding and delivery of a predetermined area of plastic sheet into the oven and to the die forming area, as herein described.

Figures 7, 8:
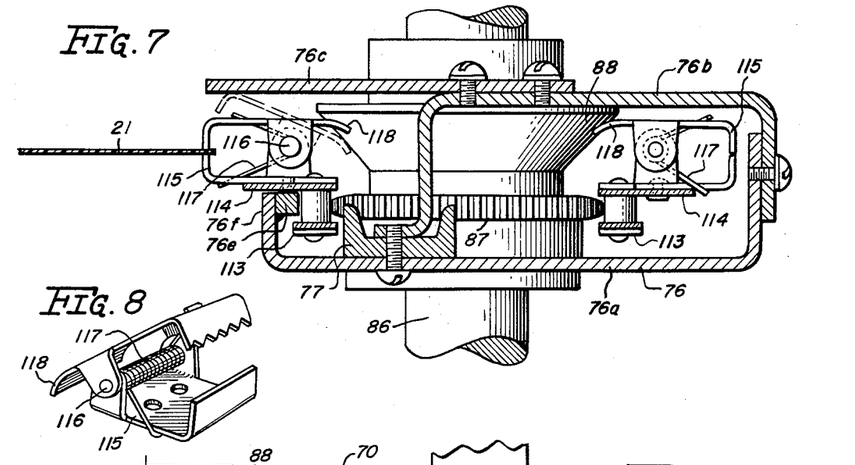
FIG. 7 is an enlarged cross sectional view on a horizontal plane, indicated by line 7—7 of FIG. 2.
FIG. 8 is an enlarged perspective view of one of the clamps shown in FIG. 7.

Referring to FIGS. 1, 4 and 7, numerals 75 and 76 designate two separate elongated channel-like metal guide and guard members, each of which are composed of three separate elongated connected sections, as illustrated in FIG. 4. The lower section of each of said guide members, designated as 76a, is of channel-like cross section, the intermediate member of each said guide members is of U-shaped cross section and designated as 76b, and the upper portion of each thereof is a flat guard plate and shield 76c, which has one lateral edge welded to the intermediate section 76b and projects inwardly, as illustrated in FIGS. 4 and 7. Mounted in the intermediate portion of each of said chain guide members is an upwardly opening metal channel 77 in which is connected one leg portion of the intermediate channel member 76b. It will be noted that the secured-together intermediate section 76b and the lower channel 76a provide a closed tunnel through which the endless chains 112 and 113 travel respectively, as hereinafter described.

As illustrated in FIG. 4, two longitudinally extending rails 76e are mounted against the inside of the inner edge flanges 76f respectively of the two lower channel sections 76a, so that the rollers of the two endless link chains ride on said rails and are thereby held to travel in parallel paths, to prevent sagging of the carried plastic sheets.

Figure 9:
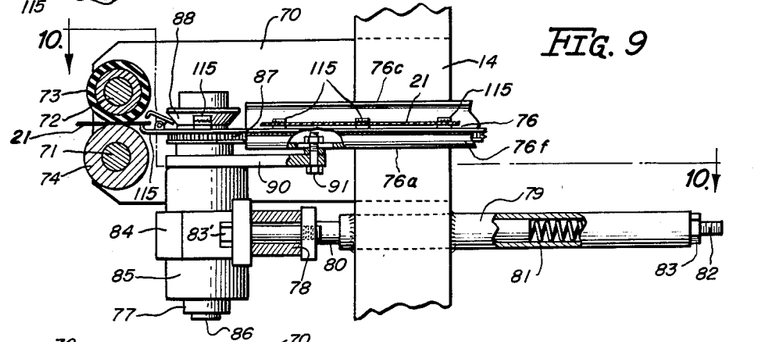
FIG. 9 is an enlarged elevation, with parts broken away and in section, of the adjustable chain mounting mechanisms at the rear end portion of the machine.

As shown in FIG. 1, mounted on the rear end portion of the machine and connected to the rearmost standards 14 is a pair of horizontal pipes 79, one of which is illustrated in cross section in FIGS. 1 and 9. Slidably mounted in each of said pipes 79 are mounting bars 80, whose outer ends are apertured and whose inner ends are normally pressed outwardly by expansion springs 81, one thereof being shown in FIG. 9. The inner end of each expansion spring 81 is normally engaged by the head of an adjusting bolt 82 which is suitably threaded and mounted by an adjusting nut in the inner end of each said pipe 79. Said springs 81 are adapted to be placed in the desired tension and position by the lock nuts 83 so that the tension of springs 81 may be adjusted and the mounting bars 80 pressed outwardly under greater or less force, as described (see FIG. 9).

Figure 10:
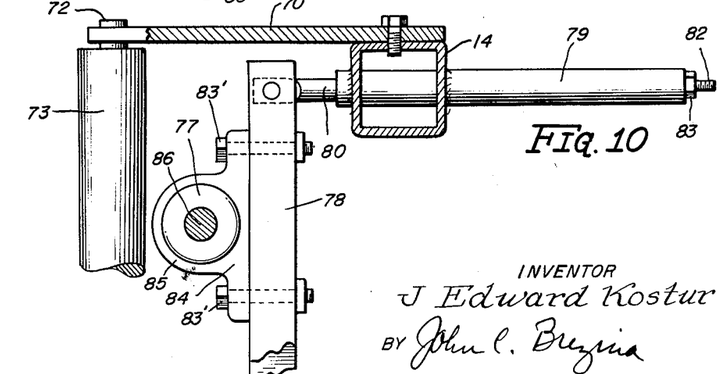
FIG. 10 is an enlarged view taken on line 10—10 of FIG. 9 and illustrating parts of the adjustable chain mounting means at the rear portion of the machine.

As shown in FIG. 9, mounted on the projecting ends of the two slidable mounting bars 80 is a transverse and horizontal bar 78, a fragment of which is illustrated in FIGS. 9 and 10, said cross bar 78 connecting both of the projecting ends of the slidable bars 80. As shown in FIG. 10, mounted by bolts 83' on the opposite end portions of the horizontal cross mounting bar 78, is a pair of bearing clamps 84, in each of which is mounted a vertically passaged metal casing 85 which carries a bearing 77 therein, as shown in FIGS. 9 and 10.

Mounted in each of the bearings 77 is a vertical stub shaft 86 whose upper end extends upwardly and has securely mounted thereon a horizontal sprocket 87, as shown in FIG. 9. Mounted on each of said stub shafts 86 above said sprockets 87, respectively, are beveled grooved collars 88, one of which is shown in FIG. 9.

As shown in FIG. 9, the upper end portions of the casings 85 are reduced and each thereof has mounted thereon a metal passaged conecting link 90 whose inner end is secured by a bolt 91 to the rear end portions respectively of the lower channel 76a of the chain guiding and supporting members hereinbefore described, said metal links 90 thereby supporting the rear end of said chain guiding and protecting members 75 and 76 at the rear end of the machine.

Figure 3:
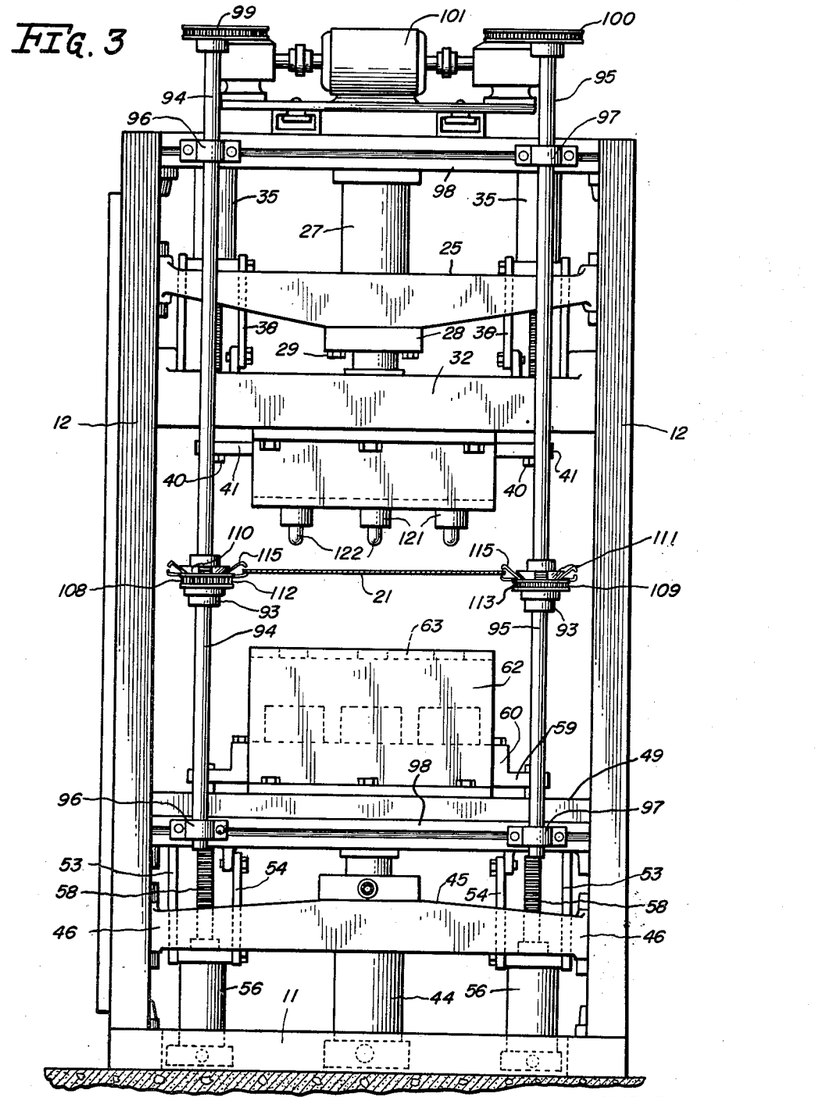
FIG. 3 is an enlarged front elevational view taken on a vertical plane.

The forward ends of said two chain guiding and protecting members 75 and 76 are supported by a pair of metal passaged links 92, respectively, as shown in FIG. 1, and these are bolted or riveted thereto and are supported by collars 93 securely mounted on two vertical driven shafts 94 and 95 at the forward end of the machine, as shown at the right of FIG. 1 and in the middle part of FIG. 3.

*Power means for driving feed chains*

As shown in FIGS. 1 and 3, the pair of elongated driven shafts 94 and 95 are journalled in spaced apart relation on the transverse cross bars on the forward or front part of the machine by means of metal brackets 96 and 97, respectively, which said brackets are suitably secured by bolts to the upper horizontal cross truss 98 and to the lower horizontal cross truss 98, as shown in FIG. 3.

Mounted on the upper ends of each of said vertical driven shafts 94 and 95 are secured sprockets 99 and 100, respectively.

Referring to FIG. 2, which is a top plan view of said machine with parts broken away, numeral 101 is an electric motor suitably mounted on a base 102, and which is electrically connected to a control switch on the control panel of the machine shown in FIG. 1, and to a source of electric power. The opposite ends of the armature shaft of said electric motor 101 are connected by suitably secured couplings to two speed reducers 103, respectively, said speed reducers having vertically extending output driven shafts on which are mounted suitable sprockets 104 and 105, respectively, which are in a plane common to the sprockets 99 and 100. An endless chain 106 operatively connects sprockets 100 and 104, and an endless chain 107 operatively connects sprockets 105 and 99, so that operation of said motor will transmit rotative force in a common direction to the two vertical shafts 94 and 95.

As shown in FIGS. 1 and 3, mounted on intermediate portions of the two shafts 94 and 95 are suitably secured sprockets 108 and 109, respectively, which are mounted in a plane common to the rear sprockets 87 at the rear of the machine.

Also mounted on the shafts 94 and 95, respectively, and immediately above the two sprockets 108 and 109 are two beveled collars 110 and 111, respectively, as shown in FIG. 3.

As shown at the opposite ends of FIG. 1, an endless link chain 112 is mounted for rotation upon one of the rear sprockets 87, respectively, and on the forward sprocket 108, the said chain extending through the guiding and guarding member 75. A similar endless metal link chain 113 is mounted on the other two aligned sprockets 87 and 109 along the other side of the machine and is adapted to ride and travel about the said two sprockets and within the other of said chain guiding and guarding members 76, one of which is illustrated in cross section in FIG. 7. Cross sectional fragments of said chain 113 are illustrated in FIG. 7, the same having the usual rollers thereon.

Spaced apart links of each of said endless chains 112 and 113 have longitudinally spaced link connectors 114. The upper link connectors 114 are enlarged and project transversely relative to the rollers of said chains, as illustrated in the cross section of FIG. 7. Mounted on said respective spaced apart elongated projecting apertured portions of connectors 114 of said connecting links are pivotal metal clamps generally designated as 115 and each of which are composed of two claw or jaw portions pivotally connected together at their intermediate ears and by pins, as illustrated in FIG. 7. The respective jaw portions of each of said clamps 115 are pivotally connected together by pivoting pins 116 on which are mounted coiled springs 117 whose opposite free ends project and engage the gripping portions of said clamps to normally hold the jaws of said clamps in pressing engagement with each other, as illustrated in FIG. 7.

The rear portion of the upper jaw of each of said clamps is curved and bent downwardly, as indicated at 118, and these downwardly bent clamp portions are adapted to be engaged by respective conical and bevelled faces of the collars 88, 110 and 111, so that as each of said clamps reach a position of contact with said curved portions 118, said curved portions will be depressed and moved downwardly to thereby open and hold open each of said clamps as long as each curved clamp portion is engaged by conical faces of said bevelled collars 89, 110 and 111.

In FIGS. 11, 12 and 13, I have illustrated, partially in cross section, a typical split die, or multiple die, composed of separable sections and also a passaged cavity mold 64.

The manifold 60 of the sub-platen 59 has spaced apart passages therein, as illustrated. A cavity mold 64 is suitably mounted on the upper face of the manifold 60 so that its air passages register with certain of the passages in the manifold 60.

The sub-platen 59 is communicatively connected to a vacuum pump (not shown), which is automatically operated and controlled. The upper die section has two parallel vertical walls 62 connected by the top plate 63 which has a passage 120 therein which cooperates with and receives a male die for cutting and shearing purposes. Plastic sheet 21, after suitable heat thereof, is positioned in the manner herein described on the upper flat face of the die plate 63.

The lower sub-platen 59, the manifold 60, and cavity mold 64 are moved upwardly adjacently under side of die plate 63. The upper platen 32 (FIG. 4) carries a die section 121a resembling the section including the die plate 63 on the lower platen 49. The die section 121a includes an outer die holder plate 121b which supports the male die 121 having a depending stud 122. The upper platen is moved downwardly to the position of the die 121 illustrated in FIG. 12 in which the stud 122 pushes the heated plastic into the cavity mold 64.

Thereupon a vacuum is produced in the cavity mold to thereby cause the atmospheric pressure to press the heated plastic against the inside faces of the cavity mold. Thereupon, the lower platen with manifold 60 and cavity mold 64 are lowered by the air-operated mechanism, hereinbefore described, to position as illustrated in FIG. 13, and thereupon the ejection and delivery tray 119 is moved mechanically, horizontally and automatically into the space between the mold 64 and below the formed plastic.

Thereupon, the upper platen and sub-platen are moved a short distance downwardly by the automatic mechanism hereinbefore described, to cause the shank of the male die portion 121 to shear and trim the formed article from the remainder of the plastic sheet and to push it downwardly out of the passage 120 so that it will drop on to the reciprocating delivery tray 119 to be thereby withdrawn for use. The horizontal reciprocating movements of the delivery and withdrawal tray 119 are actuated by electrically operated switch controlled mechanism (not shown), one of the control switches operating same being shown as mounted on the control box in FIG. 1.

It is to be understood that movements of said link chains 112 and 113 are intermittently operated through the electrical switch means of the machine, and during the interval of time that the platens and sub-platens are actuated and one plastic article is being formed, the next section of the plastic sheet is being held by the link chains and gripping means thereon between the respective ovens and heating elements to be heated and softened to the desired degree; and that upon completion of the vacuum molding or die-forming of one article, one of the switches on the control box will be automatically closed (see FIG. 1), to cause said plastic-conveying chains to advance forward to carry the heated and softened plastic section to the area between the retracted platens and dies thereon.

As the respective spring-pressed transversely extending clamps 115 on said link chains 112 and 113 are moved around the two rear sprockets 87, respectively, the upper portions of said gripping clamps are depressed and held in open position until each clamp has traveled inwardly into the machine, and as each clamp is disengaged by the beveled face of the collars 88, said clamps will be closed by the springs thereof to grip the edge portions of the plastic sheet respectively.

Said gripping and holding engagement continues during the forward travel of the link chains until after the vacuum molding and die-forming step, and as said link chains travel forwardly and cause the clamps to contact the annular beveled faces of the two forward collars 110 and 111, the upper pivoted portions of the clamps are again thereby depressed and opened to thereby release said clamps and permit their continued travel in annular paths around the said forward pulleys 110 and 111.

As illustrated in FIG. 1, I provide a pair of horizontal brackets 124 which have one end portion thereof adjustably secured, for example, by bolts, for varying heights on a secured vertical channel 125. Said brackets 124 extend inwardly and each has mounted thereon an electrical stop control or limit switch 126 which has mounted on the upper or lower portion thereof a pivoted metal arm 127. Each of said arms 127 has a roller 128 journalled thereon, which said rollers are contacted by the upper and lower platens respectively to thereby actuate and open said switches respectively when said platens cause such circuit-opening movement of the arms 127.

Said control and limit switches 126 are electrically connected by wires (not shown), to an electric power source (not shown), and are electrically connected to the electrically powered pumps which pump hydraulic fluid into the upper and lower hydraulic cylinders 27 and 44, respectively, which provide the previously described means for slidably moving the upper and lower platens respectively in the manner hereinbefore described.

The sequence of operation and steps are briefly summarized as follows:

(1) A section of the sheet plastic is pulled horizontally off of the supply roll and between rollers 73 and 74 and into the area between the ovens and their respective heating elements. The heating elements are electrically connected to a timing switch, which limits the interval of time that the heating elements are energized. The feeding or delivery of said plastic sheet to position between said ovens is by actuation of the electrical switch which energizes the electric motor 101 and drives the vertical shafts 94 and 95, which in turn drive the link chains 112 and 113 whose clamps are opened as they engage the rear beveled pulleys 110 and 111 to thereby grip the sheet plastic and pull it the desired distance into the area between the ovens, whereupon said chains are stopped by operation of said switch means.

(2) After the desired interval of time needed to heat and soften the plastic sheet between the ovens, the switch is actuated to cause the conveyor link chains to be driven forward to pull horizontally the section of the heated plastic into the area between the upper and lower platens and the upper and lower sub-platens which carry the molds and the dies.

(3) Thereupon, a separate control switch is actuated to cause hydraulic liquid to be pumped into the lower cylinder 44 to cause the lower platen 49 to be elevated to the position as limited by the pre-set lower limit switch 126 herein described. The top die plate 63 on the lower platen thereby is moved so that its upper face contacts the underface of the heated plastic sheet 21 (FIG. 11).

(4) Thereupon, another switch is actuated to open the supply of compressed air to the two lower cylinders 56 to cause the lower sub-platen to raise the passaged cavity mold 64, shown in FIG. 11, to be moved to closed position by the actuated upward movement of the two lower rack bars 58, as illustrated in FIG. 12, so that the upper face of the mold contacts the underface of the top die plate 63.

(5) Thereupon, another control switch is actuated to cause hydraulic fluid to enter the upper hydraulic cylinder 27 to cause the upper platen 32 to descend so as to lower said platen which carries or supports the male portions of the dies to thereby push portions of the hot sheet plastic into the die cavities, as illustrated in FIG. 12.

(6) Thereupon, another switch is automatically actuated to communicatively connect a vacuum pump source to the manifold 60 of the lower sub-platen 59 to thereby cause atmospheric pressure to press from above the plastic completely into the cavity mold and to expand it therein.

(7) Thereupon, by automatic operation of one of the switches, illustrated on the control box in FIG. 1, compressed air is admitted into the two lower air cylinders 56 to cause the two lower rack bars 58 and the lower sub-platen 59 to be lowered, to thereby move downward the cavity portion of the mold to the lowered position illustrated in FIG. 13.

(8) Thereupon, the reciprocating parts-ejecting member or ejection tray 119 is horizontally projected by mechanical means between the separated dies.

(9) Thereupon, the upper platen 32 is lowered by hydraulic means, actuated by a switch on the control panel illustrated, to cause the cylindrical portion of the upper die 121 to push downward and shear off the plastic unit to cause it to drop downward upon the ejection tray 119.

In instances where the relative positions of the dies and molds are reversed from that illustrated, and where the heated plastic is to be pushed upwardly into a cavity mold and the final punching and trimming step formed by a lower die, the upper sub-platen 41 would be actuated and lowered in the same manner as described with reference to the upward movement of the lower sub-platen 59 in the preferred form illustrated. In the illustration shown, the upper sub-platen 41 is not employed.

(10) After the article formed has dropped to the article ejector means described, both of the platens are retracted by actuation of the described appropriate switch means operatively connected thereto. The respective parts are then in a position to repeat the described cycle of operation.

While I have described the foregoing preferred form as using a split or sectional die having a separate movable section or mold, I desire it to be understood that said machine may be satisfactorily used for conventional types of vacuum molding of plastics and plastic sheets and utilizing merely conventional molds or dies which are passaged to easily communicate the interior thereof with the vacuum source.

While the foregoing specification sets forth the invention in specific terms, it is to be understood that numerous changes in the shape, size and materials may be resorted to without departing from the spirit and scope of the invention as claimed hereinafter and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a machine for automatically molding and die trimming plastic articles from plastic sheets; a frame; a plurality of transversely spaced apart vertical guide and mounting bars mounted in said frame; a pair of passaged mounting spiders adjustably mounted on said guide bars; an upper and a lower platen slidably mounted on said guide bars; drive mechanisms on said spiders operatively connected to selectively raise and lower said platens respectively, said platens being adapted to support cooperating dies thereon; mechanism for automatically gripping and conveying sheet plastic to the area between said platens comprising a pair of driven shafts journalled at the front of said frame; a prime mover on said frame for driving said shafts; a pair of idler shafts journalled at the rear portion of said frame; sprockets mounted on said shafts respectively; a pair of endless link chains mounted on said sprockets, said chains being movable in a substantially horizontal plane along the opposite sides of said frame; releasable means on said chains for gripping sheet plastic, including spring-pressed clamps; means on said shafts for opening said clamps to grip said sheet plastic and to thereafter release said sheet plastic; spring-pressed means connected to said frame for normally holding said link chains under tension; and means for guiding said chains between said shafts respectively.

2. A machine for molding and forming plastic articles substantially as recited in claim 1, wherein said spring pressed means for holding said link chains taut includes a pair of rearwardly extending cylinders; adjustable springs in said cylinders; plungers slidable in said cylinders; a connecting bar connecting the outer ends of said plungers, and journalling blocks in which said sprocket carrying rearward shafts are journalled, and having guiding and track members for said chains and connected to said forward driven shafts and adjustable connected to said last mentioned journalling blocks.

3. In apparatus for forming an article from sheet material, the combination of
a first member having a molding cavity therein substantially conforming to the desired outer shape of said article,
a second member having a plunger thereon aligned with said cavity,
means mounting said members for reciprocable movement toward and away from one another to controllably move said plunger partially into said cavity,
a plate disposed between said members and having therein an aperture aligned with said plunger and said cavity to permit the passage of said plunger therethrough into said cavity,
said plate having a die section surrounding said aperture,
said second member having a die section complementary to said die section on said plate,
means operative in an article forming cycle of said machine for feeding said sheet material between said plate and said second member,
means thereafter operative for moving said members into a first relative position wherein said plunger is disposed within said cavity to move a portion of said sheet through said aperture into said cavity,
means thereafter operative to apply a differential pressure between said cavity and the side of said sheet opposite thereto to conform said sheet to said mold cavity,
means thereafter operative to move said first member away from said second member and away from said plate,
and means thereafter operative to further move said second member toward said plate to move said complementary die sections into operative engagement to sever the molded portion of said sheet from the remainder thereof.

4. The combination set forth in claim 3 wherein said last named means moves said complementary die section on said second member substantially through said plate whereby to push the molded article out of engagement with said plate.

5. The combination set forth in claim 3 wherein said plate and said first member together form a female die section, and said first member tightly engages said plate during the application of said differential pressure.

6. The combination set forth in claim 5 wherein the differential pressure applying means includes a vacuum source connected to said mold cavity and said die sections are spaced a substantial distance apart during the application of said differential pressure whereby atmospheric pressure acts on the side of said sheet portion opposite said mold cavity.

7. In apparatus for forming articles from a sheet of plastic material, the combination of
a first mold having a cavity therein,
a second mold having a plunger portion receivable in said cavity,
a die plate mounted between said first and second molds and having an aperture therein aligned with said cavity and with said plunger,
means for feeding said sheet between said die plate and said second mold,
means mounting said second mold for movement of said plunger through said aperture to mechanically press a portion of said sheet toward said first mold,
means mounting said first mold for movement into engagement with said die plate whereby said portion of said sheet is disposed within said cavity,
means for applying a differential pressure across said portion of said sheet to conform said portion to the shape of said cavity,
a die section on said second mold,
means operative, after the application of said differential pressure, for moving said first mold away from said die plate,
means operative after the application of said differential pressure for moving said second mold further toward said die plate to move said die section into cutting relationship with said die plate to sever said sheet portion from the remainder of said sheet,
and means for extracting said severed portion from between said first and second molds.

8. Molding apparatus comprising
support means for movably supporting a pair of molding members in opposed relationship for controlled movement toward and away from each other,
a cutting die mounted between said molding members,
conveyor means for moving a sheet of moldable sheet material between said molding members,
said support means then being operative to move said members a first distance toward one another to force a portion of said sheet material into one of said members to effect at least a portion of a molding operation,
and said support means thereafter being operative to move said one member away from said die and to move the other said member an additional distance toward and into cutting relationship with said die to sever said portion of said sheet from the remainder of said sheet.

9. Molding apparatus for articles comprising first and second molding members mounted for controlled movement toward and away from each other,
   a cutting die mounted between said molding members,
   means for introducing a sheet of moldable sheet material between said molding members,
   means for moving said molding members a first distance toward one another to force a portion of said sheet material into the first of said members to effect at least a portion of a molding operation of an article,
   said moving means thereafter being operative to move said first member in a direction opposite to its first direction of movement to remove said first member from the molded article,
   and said moving means being operative to move the second said member an additional distance in the direction of its initial movement and into cutting relationship with said die to sever said portion of said sheet material from the remainder of said sheet material.

10. A molding apparatus as in claim 29 wherein said cutting die cooperates with said molding members to form a portion of the mold for the article,
    said mold forming portion of said die being dimensioned to receive a part of said second molding member,
    and said moving means being further operative, after said portion of said sheet is severed, to move said second molding member to be received by said die and thereby to push the article out of said die.

References Cited by the Examiner
UNITED STATES PATENTS

| | | | |
|---|---|---|---|
| 1,667,673 | 4/28 | Pierson et al. | 18—19 XR |
| 2,017,459 | 10/35 | Howe et al. | |
| 2,521,388 | 9/50 | Maynard et al. | 18—19 |
| 2,962,758 | 12/60 | Politis | 18—19 |
| 2,967,328 | 1/61 | Shelby et al. | 18—19 |

FOREIGN PATENTS

| | | |
|---|---|---|
| 1,238,420 | 6/60 | France. |

WILLIAM J. STEPHENSON, *Primary Examiner.*

MICHAEL V. BRINDISI, *Examiner.*

UNITED STATES PATENT OFFICE
CERTIFICATE OF CORRECTION

Patent No. 3,193,881                                           July 13, 1965

J. Edward Kostur

It is hereby certified that error appears in the above numbered patent requiring correction and that the said Letters Patent should read as corrected below.

Column 3, line 5, for "sub-plates" read -- sub-platens --; column 14, line 1, for the claim reference numeral "29" read -- 9 --.

Signed and sealed this 15th day of March 1966.

(SEAL)
Attest:

ERNEST W. SWIDER
Attesting Officer

EDWARD J. BRENNER
Commissioner of Patents